Jan. 5, 1965 R. W. LARSON 3,164,261
STABILIZING LEG ASSEMBLAGE
Filed Jan. 21, 1963 2 Sheets-Sheet 1

INVENTOR.
ROBERT W. LARSON
BY Meyers & Peterson
ATTORNEYS

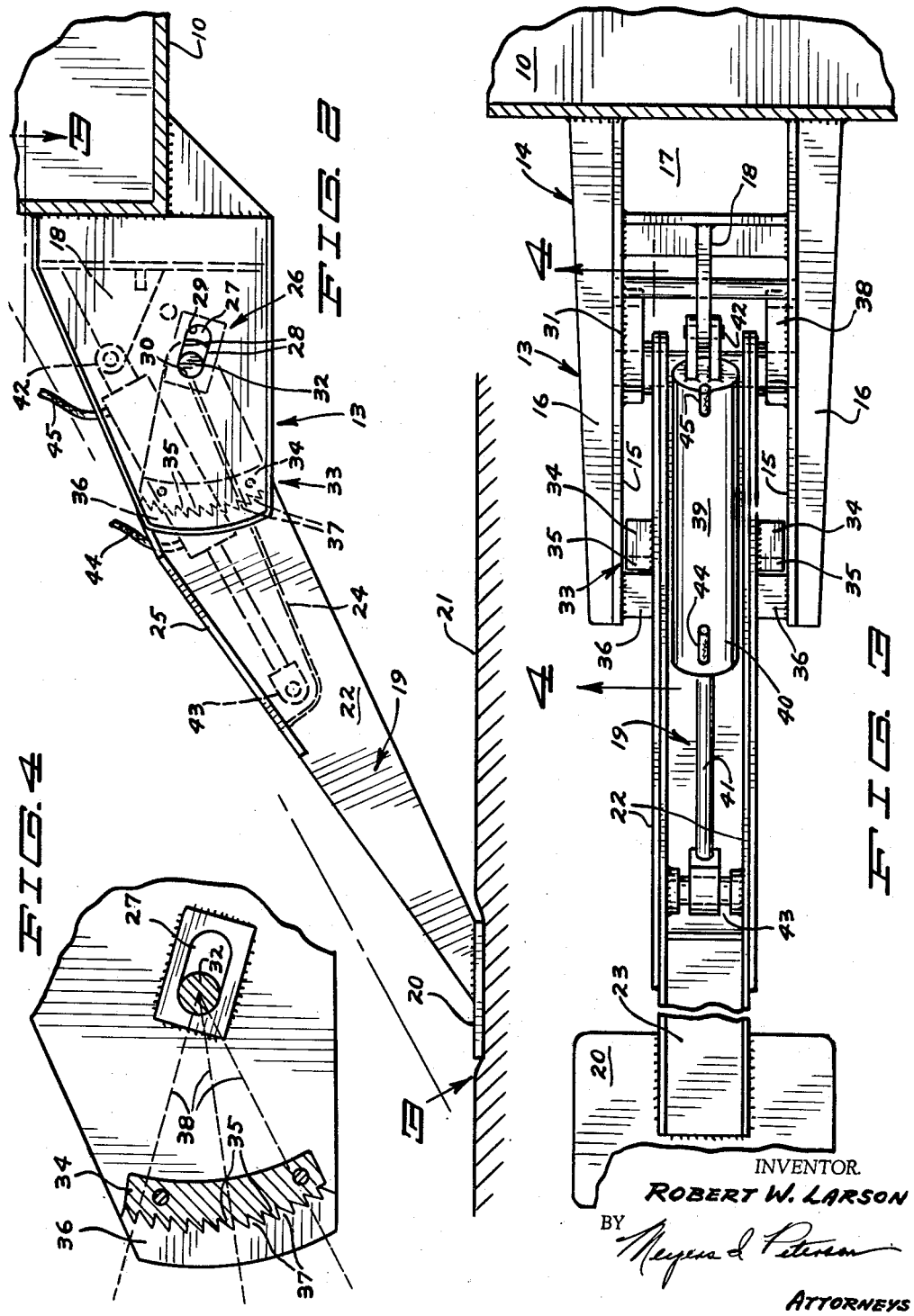

United States Patent Office 3,164,261
Patented Jan. 5, 1965

3,164,261
STABILIZING LEG ASSEMBLAGE
Robert W. Larson, Ashland, Wis., assignor to Beloit
Corporation, a corporation of Wisconsin
Filed Jan. 21, 1963, Ser. No. 252,895
9 Claims. (Cl. 212—145)

This invention relates to the art of stabilizing bodies which are subject to lateral stresses, and more particularly to stabilizing leg assemblages which are attached to bodies such as vehicle platforms for shifting into firm contact with a supporting surface.

The desirability of additionally bracing or stabilizing wheeled equipment has long been recognized. A number of such bracing devices have been proposed and utilized for holding heavy units of vehicle equipment steady while they are subjected to shifting forces such as may be created by a working boom mounted on the vehicle body. The swinging of a long boom from such vehicle may itself render the equipment unstable and the effect of adding loads to the boom intensifies the problem. It is, therefore, desirable to provide legs or braces which extend from the mounting platform and engage the ground firmly, and well outside the area encompassed by a vertical line through the extreme positions of the center of gravity which continually shifts with the operation of the equipment. For such unstable bodies, it is also desirable that the legs be capable of re-adjustment as the supporting surface yields under variable forces and as the vehicle is moved from one location to another.

It is within the contemplation of the present invention and a general object thereof to provide an improved stabilizing leg assemblage which can be set, adjusted and retracted by a remotely operable actuator.

More specifically, it is an object of the invention to provide a heavy duty stabilizer leg assembly which can be rapidly actuated to a strongly locked position by a single actuator.

A further object of the invention is to provide a pivoting and locking connection between the leg and its bracket mount which will permit setting and adjustment thereof under non-working conditions with the application of force by a lightly constructed actuator, the latter causing the relatively stronger locking connection to be established and maintained without increasing the stress upon the actuator when heavy load conditions are encountered during the operation of booms, grapples, loaders and the like.

A still further object is to provide a stabilizer leg assemblage of the class described wherein shifting and locking of the leg is caused to occur only after a firm preloading force has been applied to the leg. Vehicle spring suspensions and pneumatic tires can thus be partially relieved of the weight of the superstructure and equipment supported thereon, and can remain unaffected by the application of heavy forces such as are established by loading and unloading grapples from a swinging boom.

These and other objects and advantages of my invention will more fully appear from the following description, made in connection with the accompanying drawings, wherein like reference characters refer to the same or similar parts throughout the several views and in which: FIGURE 1 is a side elevation of the stabilizer leg assemblage showing a typical mount at the corner of a vehicle platform, the stabilizer leg being represented in raised condition by a full line configuration and in lowered condition by dotted configuration;

FIGURE 2 is a side elevation of the leg assemblage which is similar to that of FIGURE 1 but shows the leg in set and locked position;

FIGURE 3 is a somewhat enlarged top plan view of the assemblage taken on the line 3—3 of FIGURE 2 and looking in the direction of the arrows, and FIGURE 4 is a further enlarged fragmentary view taken on the line 4—4 of FIGURE 3 and looking in the direction of the arrows and illustrating the relationship of the load bearing interlocking joint to the pivotal axis of the leg.

Figure 1:
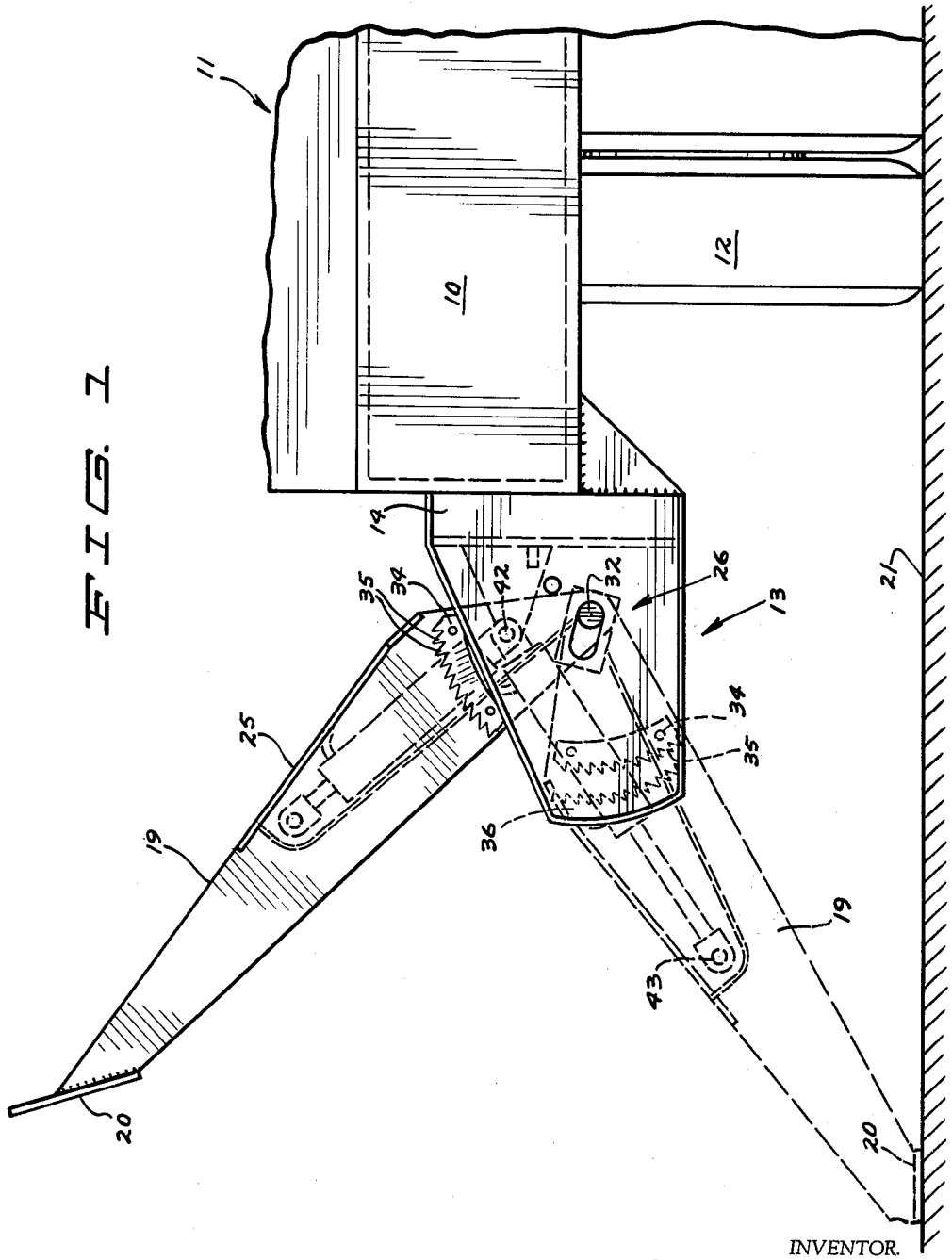

With continued reference to the drawings, the instant invention is intended to be utilized with a body such as the platform or superstructure 10 of heavy equipment 11 which by itself may constitute an unstable system. The body 10 is customarily mounted upon a spring suspension (not shown) and may be supported upon pneumatic tired wheels 12 as shown in FIGURE 1. The resiliency of wheels 12 and the spacing thereof in wheeled equipment of the type described necessarily causes the entire equipment to be unstable when lateral stresses are applied thereto. It has therefore been found that auxiliary legs extending well beyond the outer periphery of the equipment and attached directly to the platform or superstructure 10, become desirable and often necessary in order to safely permit heavy loads and forces to be applied to the platform 10.

The leg assemblage constituting the present invention is indicated generally at 13 and a plurality of these assemblages may be mounted cornerwise or at spaced intervals around the platform in such a manner that the assemblage will not unduly interfere with transportation of the equipment when the assemblage is in retracted position.

The leg assemblage has a mounting structure such as bracket 14 which is fixedly mounted as by welding to the platform 10 as shown. It is understood that the bracket may be a part of the platform itself or may be positioned variously thereon, for example, in recessed or extending form. The bracket 14 in the embodiment shown has a pair of spaced parallel plates 15 which are further braced by flange members 16 and cross member 17. A rigid pivot post 18 is fixedly secured to the cross brace 17 at a centrally located position between plates 15 as will be observed from FIGURE 3.

The movable portion of the leg assemblage 13 resides in an outwardly extending leg 19 which terminates in an end support such as the shoe 20. When the stabilizing leg assemblage is in operable position, the end support 20 is in firm contact with the ground or other supporting surface 21. Leg 19 may be conveniently formed from side plates 22 rigidly secured to a bottom plate 23 and additionally braced by such members as the sheet 24 and ribs 25 as shown.

The mounting means by which the leg 19 is secured to the bracket 14 constitutes an important part of this invention. The mounting means is indicated generally at 26 and is so constructed and arranged as to permit pivotal as well as shifting movement of the leg 19 with relation to the bracket 14. The camming slot 27 has guiding surfaces 28 and an inner stop or abutment 29 and an opposed corresponding stop or abutment 30 at the outer end of slot 27. Camming slot 27 may be reinforced for strength and wear by providing extra thickness such as with blocks 31 fixedly secured to the inner surfaces of side plates 15.

Received within the camming slots 27 is a pivot pin 32 which in turn is fixedly mounted to the inner end portion of leg 19 with its ends laterally extending therefrom and into the camming slots. The angular relation of the camming slot 27 has a purpose and function which will be described subsequently.

Another coaction between the bracket 14 and the leg 19 is established at the load bearing interlocking joint 33. This joint has a pair of locking portions which prevents the stabilizing leg 19 from yielding when it has been set in contact with the ground 21. In the embodiment shown, a toothed block 34 is fixedly mounted to the side of each of the leg plates 22 as shown in FIGURE 3. The teeth 35 of each of the blocks 34 are arcuately arranged and face radially outward from the axis of pivot pin 32 as shown in FIGURES 1 and 2. Another toothed block 36 is rigidly fixed to each of the bracket plates 15 at the ends and inner surface thereof so as to lie in confronting relation with the corresponding toothed blocks 34. The blocks 35 are provided with teeth 37 which are arcuately arranged to intermesh with the teeth 35 of blocks 34. The shape and configuration of the respective teeth and their relationship to pivot pin 32 is more clearly shown in FIGURE 4. Where a firm and safe interlock of the teeth is desired, the teeth of each block may be so shaped that the plane of contact 38 between the respective individual teeth of blocks 34 and 35 will substantially intersect the axis of pivot pin 32 or even lie somewhat therebelow. With such configuration, there is no camming influence due to external loads applied to the platform 10 which would tend to separate the blocks 34 and 35.

Operation of the stabilizing leg assemblage is accomplished through a powered extensible and retractable actuator such as the double acting hydraulic ram 39. The ram 39 may be conventional in form having a cylinder 40 with a piston and rod assemblage 41 extending longitudinally therefrom. The cylinder 40 has a pivotal mounting connection 42 with the plate 18 on bracket 14 and the rod 41 has an opposed pivotal connection 43 with leg 19 as clearly shown in FIGURE 3. Hydraulic connecting tubes 44 and 45 provide remotely controlled power for extending and retracting the ram 39 as is well known in the hydraulic cylinder art. It will be observed that the axis of the hydraulic ram passing through the pivotal connections 42 and 43 lies to the side of the axis of pivot pin 32.

In the use and operation of the stabilizing leg assemblage, the wheeled equipment is first located at its working position and then each of the leg assemblages is lowered from a raised position as shown in FIGURE 1 to the lowered dotted line position in the same figure. It is contemplated that the hydraulic ram 39 be utilized for operating the leg assemblage and not for supporting variable loads added to the superstructure 10 when the equipment itself is being utilized. For this reason, a relatively simple and small hydraulic ram 39 can be employed. The weight of the leg 19 will cause it to pivotally rotate about the axis of pin 32 as it is bottomed against the inner end 29 of the cammed slot 27 as the rod 41 extends from cylinder 40. The shoe 20 then contacts the ground 21 with the pivot pin 32 still in its inner and lower position in cammed slot 27. The toothed block 34 of the leg 19 and the toothed block 36 of the bracket 14 are in spaced confronting relation as viewed in FIGURE 1. As hydraulic power is supplied to the cylinder 40, the rod 41 continues to extend and to separate the pivot connections 42 and 43. Force is thus applied by the leg and its shoe 20 upon the supporting surface 21 to firmly set the leg and relieve some of the load of the platform 10 with respect to the wheels 12 and other suspension elements of the vehicle. With continued extending force applied to the hydraulic ram 39, the bracket 14 and platform 10 not only rise to a degree but the stabilizing leg 19 is caused to skid outwardly upon the ground or other supporting surface 21. Pressure however is maintained between the foot 20 and the supporting surface all the while. The shifting of the leg 19 causes the pivot pin 32 to ride outwardly in the cammed slot 27 and finally to become bottomed at the end 30 of the slot. Simultaneously therewith, the teeth 35 and 37 of the toothed blocks 34 and 36 become engaged, the assumed angle of the leg 19 determining which teeth and how many will become interlocked. In the instant arrangement, the cammed slot 27 is shown as being inclined upwardly and outwardly. The greater the pitch of the angle, the more setting force will be applied between shoe 20 and ground 21 before the interlocking joint becomes effected. Once the interlock is established, little or no continued force is required on the part of the ram 39. In practice however, it is customary to have the added protection of a continued biasing force tending to prevent accidental displacement of the interlocking teeth.

After each of the leg assemblages has been properly set, then unusually drastic loads and lateral stress conditions can be applied to the equipment supported on the platform 10. These unusual loads and stresses however have no effect upon the hydraulic ram 39 since it is merely holding the leg 19 on a stand-by basis at this point. After the equipment has been employed for a length of time, there may be a tendency for the foot 20 to compress the ground 21 or to dig down to a level lower than that at which the leg was first set. The operator of the equipment can then remove extraordinary loads therefrom and cause the ram 39 to retract to a slight degree. The toothed blocks 34 and 36 will then separate and upon extension of the ram the previously described cycle will be repeated. The relative arcuate positions of toothed blocks 34 and 36 however will be different and the sets of interlocking teeth will likewise be different. It is an attribute of the invention that during the raising and lowering operation, and in setting and resetting the leg, and even in locking and unlocking the assemblage, all of the functions are performed simply by extending or retracting a single hydraulic ram from a remote location. The operator of the equipment can thus devote more of his time and effort to the operation thereof, yet having the security of working with properly stabilized equipment.

It will, of course, be understood that various changes may be made in the form, details, arrangements and proportions of the parts without departing from the scope of my invention as set forth in the appended claims.

What is claimed:

1. In combination with a body having means thereunder providing normal support for said body, said body requiring stabilizing support under forces applied thereto, a stabilizing leg assemblage comprising,
   (a) a bracket secured to said body,
   (b) a leg extending from said bracket and terminating outwardly in an end support,
   (c) means mounting the inner end portion of said leg to said bracket and permitting pivotal and limited lateral shifting movement relative thereto,
   (d) a load bearing interlocking joint in a laterally spaced relation from said mounting means and having a first locking portion secured to said leg and a second locking portion secured to said bracket, said first and second locking portions lying in confronting relation, and
   (e) a powered extensible and retractable actuator secured respectively at its working ends to said bracket and said leg, said actuator first pivoting said leg and its end support into supporting position, then shifting the leg outwardly relative to said bracket for engaging and interlocking said confronting first and second locking portions.

2. In combination with a body having means thereunder providing normal support for said body, said body requiring stabilizing support under forces applied thereto, a stabilizing leg assemblage comprising,
   (a) a bracket secured to said body,
   (b) a leg extending from said bracket and terminating outwardly in an end support,
   (c) a pivot connection between the inner portion of said leg and said bracket, said pivot connection having lost motion means permitting both pivotal and limited lateral shifting movement of said leg with respect to said bracket,
   (d) a load bearing interlocking joint in a laterally spaced relation from said means and having a first locking portion secured to said leg and a second locking portion secured to said bracket, said first and second locking portions lying in confronting relation, and (e) a powered extensible and retractable actuator secured respectively at its ends to said bracket and said leg outwardly, said actuator first pivoting said leg and its end support into supporting position, then shifting the leg relative to said bracket for engaging and interlocking said confronting first and second locking portions.

3. In combination with a body having means thereunder providing normal support for said body, said body requiring stabilizing support under forces applied thereto, a stabilizing leg assemblage comprising, (a) a bracket secured to said body, (b) a leg extending from said bracket and terminating outwardly in an end support, (c) mounting means having a pivot pin portion transversely fixed adjacent the inner end of said leg and a camming slot portion in said bracket receiving said pivot pin portion and permitting lateral shifting thereof from one end of the slot portion to the other, (d) a load bearing interlocking joint in a laterally spaced relation from said mounting means and having a first locking portion secured to said leg and a second locking portion secured to said bracket, said first and second locking portions lying in confronting relation, and (e) a powered extensible and retractable actuator secured respectively at its ends to said bracket and said leg, said actuator first pivoting said leg and its end support into supporting position, then shifting the leg and said pivot pin portion outwardly relative to said bracket and said slot portion for engaging and interlocking said confronting first and second locking portions.

4. The stabilizing leg assemblage set forth in claim 3 wherein said camming slot portion is angulated outwardly and upwardly and lies inwardly of said interlocking joint.

5. In combination with a body having means thereunder providing normal support for said body, said body requiring stabilizing support under forces applied thereto, a stabilizing leg assemblage comprising, (a) a bracket secured to said body, (b) a leg extending from said bracket and terminating outwardly in an end support, (c) means mounting the inner end portion of said leg to said bracket and permitting pivotal and limited lateral shifting movement relative thereto, (d) a first toothed block mounted on said leg in outwardly spaced relation from said means, (e) a second toothed block mounted on said bracket outwardly of said first-mentioned toothed block, said respective toothed blocks lying in confronting relation, and (f) a powered extensible and retractable actuator secured respectively at its ends to said bracket and said leg, said actuator first pivoting said leg and its end support into supporting position, then shifting the leg outwardly relative to said bracket for engaging and interlocking said confronting toothed blocks.

6. In combination with a body having means thereunder providing normal support for said body, said body requiring stabilizing support under forces applied thereto, a stabilizing leg assemblage comprising, (a) a bracket secured to said body, (b) a leg extending from said bracket and terminating outwardly in an end support, (c) means mounting the inner portion of said leg to said bracket and permitting pivotal and limited lateral shifting movement relative thereto, (d) a first arcuately arranged toothed member fixed to said leg in a laterally spaced relationship with said mounting means, (e) a second corresponding arcuately arranged toothed member fixed to said bracket in a laterally spaced relationship with said mounting means and in confronting relation to said first member, and (f) a powered extensible and retractable actuator secured respectively at its ends to said bracket and said leg, said actuator first pivoting said leg and its end support into supporting position, then shifting the leg outwardly relative to said bracket for engaging and interlocking said arcuately arranged toothed members.

7. In combination with a body having means thereunder providing normal support for said body, said body requiring stabilizing support under forces applied thereto, a stabilizing leg assemblage comprising, (a) a bracket secured to said body, (b) a leg extending from said bracket and terminating outwardly in an end support, (c) means mounting the inner end portion of said leg to said bracket and permitting pivotal and limited lateral shifting movement relative thereto, (d) a first accurately arranged toothed member fixed to said leg in a laterally spaced relationship with said mounting means, (e) a second corresponding arcuately arranged toothed member fixed to said bracket in a laterally spaced relationship with said mounting means and in confronting relation to said first member, said confronting arcuately arranged toothed members being engageable at a plurality of relative arcuate positions, each position requiring a plurality of teeth to be simultaneously engaged, the engagement of each of said teeth with another being on a plane of contact which substantially intersects the axis of pivot of said mounting means, and (f) a powered extensible and retractable actuator secured respectively at its ends to said bracket and said leg, said actuator first pivoting said leg and its end support into supporting position, then laterally shifting the leg relative to said bracket for engaging and interlocking said confronting first and second toothed members.

8. In combination with a body having means thereunder providing normal support for said body, said body requiring stabilizing support under forces applied thereto, a stabilizing leg assemblage comprising, (a) a bracket secured to said body, (b) a leg extending from said bracket and terminating outwardly in an end support having a flat bottom surface, (c) a pivot pin secured to the inner end portion of said leg, (d) a camming slot in said bracket receiving said pivot pin and permitting shifting from one end to the other thereof, (e) a first toothed block mounted on said leg in outwardly spaced relation from said pivot pin, (f) a second toothed block mounted on said bracket outwardly of said first-mentioned toothed block, said toothed blocks lying in confronting relation, and (g) a powered extensible and retractable actuator secured respectively at its ends to said bracket and said leg, said actuator first pivoting said leg and its end support into supporting position against the ground, then outwardly shifting the leg relative to said bracket for engaging and interlocking said confronting toothed blocks as said end support slides over the ground.

9. In combination with a body having means thereunder providing normal support for said body, said body requiring stabilizing support under forces applied thereto, a stabilizing leg assemblage comprising, (a) a bracket secured to said body, (b) a leg extending from said bracket and terminating outwardly in an end support, (c) a pivot pin transversely fixed to the inner end portion of said leg, (d) a camming slot in said bracket receiving said pivot pin and being angulated outwardly and upwardly for permitting shifting of the pin from one end to the other thereof, (e) a load bearing interlocking joint in spaced relation outwardly from said pivot pin and having a first locking portion secured to said leg and a second locking portion secured to said bracket, said first and second locking portions lying in confronting relation, and (f) an elongated extensible and retractable power means having endwise pivotal securement respectively to said bracket and to said leg, a line through the points of pivotal securement of said power means lying above said pivot pin and said camming slot.

References Cited by the Examiner
UNITED STATES PATENTS

| 2,375,264 | 5/45 | Wagner et al. | 212—145 |
| 2,463,655 | 3/49 | Temple | 248—168 |
| 2,621,811 | 12/52 | Lull | 214—75 |
| 2,855,111 | 10/58 | McIntyre | 212—145 |

SAMUEL F. COLEMAN, *Primary Examiner.*

FRANK L. ABBOTT, *Examiner.*